United States Patent [19]

Brown

[11] Patent Number: 5,385,256

[45] Date of Patent: Jan. 31, 1995

[54] FILLER NECK CLOSURE CAP

[75] Inventor: David M. Brown, Oregon, Ill.

[73] Assignee: Stant Manufacturing Inc., Connersville, Ind.

[21] Appl. No.: 4,686

[22] Filed: Jan. 14, 1993

[51] Int. Cl.$^6$ .......................................... B65D 45/28
[52] U.S. Cl. ................................. 220/323; 220/315; 220/367; 220/DIG. 33
[58] Field of Search ............... 220/323, 231, 307, 315, 220/318, 326, 367, DIG. 32, DIG. 33

[56] References Cited

U.S. PATENT DOCUMENTS

| | | | |
|---|---|---|---|
| 2,772,809 | 12/1956 | Ross | 220/323 X |
| 3,074,588 | 1/1963 | Burdue | 220/231 |
| 3,126,728 | 3/1964 | Nehls | 220/315 X |
| 3,186,580 | 6/1965 | Previte | 220/231 X |
| 3,820,680 | 6/1974 | Friend | |
| 4,007,849 | 2/1977 | Hinkle | 220/323 X |
| 4,294,376 | 10/1981 | Keller | 220/318 |
| 4,498,493 | 2/1985 | Harris | |
| 4,693,389 | 9/1987 | Kalen | 220/236 |
| 4,887,733 | 12/1989 | Harris | |
| 5,169,015 | 12/1992 | Burke | 220/203 |

Primary Examiner—Allan N. Shoap
Assistant Examiner—Vanessa Caretto
Attorney, Agent, or Firm—Barnes & Thornburg

[57] ABSTRACT

A push-on filler neck cap for a fill passageway of a tank. The cap is provided with a push top and a dependent housing sized to fit within the fill passageway and with a fill passageway seal that is located at the lower inserted end of the housing and wherein the can is also provided with a restraining mechanism located between the push top and the fill passageway seat for securing the cap to the passageway in a sealed manner. The restraining mechanism is defined by a plurality of lugs which: 1) engage into a recess in the fill passageway; 2) pivot outward from the housing to engage the recess in response to movement of a spring biased lever pivotedly mounted to the push top with the recess; and (3) are biased to pivot outwardly for engagement with the recess by a spring located within the housing, which spring also urges the seal into its sealing relationship within the fill passageway.

42 Claims, 6 Drawing Sheets

FILLER NECK CLOSURE CAP

BACKGROUND AND SUMMARY OF THE INVENTION

This present invention relates to tank filler neck caps and, particularly, to a push-on filler neck cap. More particularly, the present invention relates to a filler neck cap including an attachment mechanism for enabling a user to attach the cap to the filler neck quickly and easily and establish a sealed connection between the cap and the filler neck.

Conventional caps for closing the filler neck of a vehicle fuel tank typically include a closure member for closing the mouth of the filler neck and a handle for turning the closure member to mount the closure member in the filler neck. Partial-turn cam-on caps and multiple-turn threaded caps are well-known types of caps for use in closing filler necks. See, for example, U.S. Pat. Nos. 4,887,733 to Harris and 3,820,680 to Friend. Although turn-to-install caps are currently in widespread use, it would be desirable to provide an alternative cap that is simpler to install on and remove from a filler neck.

More and more vehicle drivers are using the self-service bays at gasoline stations and filling their own fuel tanks. Some people have found that it is difficult to remove and install a conventional partial-turn or multiple-turn filler neck cap during refueling. A cap that is readily installable on and removable from a filler neck by a user without a lot of effort and that is configured to establish a sturdy sealed connection between the cap and the filler neck consistently during use would be a welcomed improvement over conventional caps.

What is needed is a push-on filler neck cap that can be installed easily in the fill passageway of a filler neck. Once installed, a sealed liquid fuel and fuel vapor barrier would be in place near the mouth of the filler neck. Ideally, such a push-on cap would be provided with a cap-release mechanism that is easy to manufacture, assemble, and use.

According to the present invention, a push-on cap is provided for engaging a filler neck. The cap includes a housing sized to fit into a fill passageway in the filler neck and closure means for closing the filler neck. The closure means is coupled to an axially inner end of the housing. The cap further includes means for pushing the housing and closure means as a unit into the fill passageway to seat the closure means on a seal-receiving seat provided in the fill passageway in spaced-apart relation to the open mouth of the filler neck. The pushing means is coupled to the axially outer end of the housing.

The cap further includes means for retaining the housing and the closure means in a filler neck-closing position in the fill passageway during installation of the cap. The retaining means includes at least one retaining lug mounted on the housing for pivotable movement between a projected position fitting into a cap-retention cavity formed in the filler neck and a retracted position away from the cap-retention cavity during movement of the housing into and out of the fill passageway. The retaining means also includes spring means for automatically yieldably biasing each retaining lug toward its projected position so that each retaining lug snaps automatically from its retracted position to its projected position in the cap-retention cavity during push-on installation of the cap on the filler neck. Thus, the housing and closure means are automatically retained in the fill passageway during installation of the cap.

In preferred embodiments, three pivotable retaining lugs are mounted around the circumference of a cylindrically shaped housing. Each retaining lug includes a radially outwardly extending locking arm, a central pivot axis, and a radially inwardly extending toggle arm. Each locking arm is configured to fit into the cap-retention cavity formed in the filler neck upon pivoting movement of the retaining lugs to their projected positions. The toggle arms are used to pivot the retaining lugs about their pivot axes to project the locking arms in radially outward directions into the cap-retention cavity as soon as the cap is pushed far enough into the fill passageway of the filler neck. Illustratively, the filler neck is formed to include a single ring-shaped cap-retention cavity. Alternatively, the filler neck could be formed to include a separate cap-retention cavity for each retaining lug.

A lug actuator is mounted for vertical movement in an interior region of the housing and includes a downwardly opening cup-shaped part. The spring means has an upper end extending into the cup-shaped part of the lug actuator and a lower end acting against the closure means. The lug actuator also includes means around the cup-shaped part for moving the toggle arms of the retaining lugs to pivot the retaining lugs about their pivot axes between their projected and retracted positions. The spring means is positioned to push upwardly against the lug actuator so that it moves the toggle arms automatically to pivot the locking arms into the cap-retention cavity during installation of the cap in the filler neck.

The cap also includes a control mechanism for releasing the retaining means to allow a user to withdraw the cap from the filler neck. Illustratively, the control mechanism includes a vertical stem on the top of the cup-shaped portion of the lug actuator. The housing is formed to include a stem-receiving aperture. The stem moves up and down in that aperture during vertical movement of the lug actuator in the housing. The control mechanism also includes a cap-release lever pivotably mounted to an outer shell coupled to the axially outer end of the housing and a cam on the cap-release lever in engagement with a cam follower on the stem of the lug actuator. This cam mechanism allows a user to move the lug actuator manually so that the retaining lugs are pivoted to their retracted positions whenever the user wishes to remove the cap from the filler neck.

To remove the cap from the filler neck, a user first pivots the cap-release lever from a horizontal cap-retaining position to a vertical cap-releasing position. This movement causes the cam on the cap-release lever to turn and allow the upwardly biased lug actuator to move downwardly in the housing. Such downward movement of the lug actuator automatically pivots each retaining lug to its retracted position to disengage the cap-retaining means in the filler neck. The user is now free to lift on the handgrip provided on the outer shell to withdraw the housing and closure means as a unit from the fill passageway.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
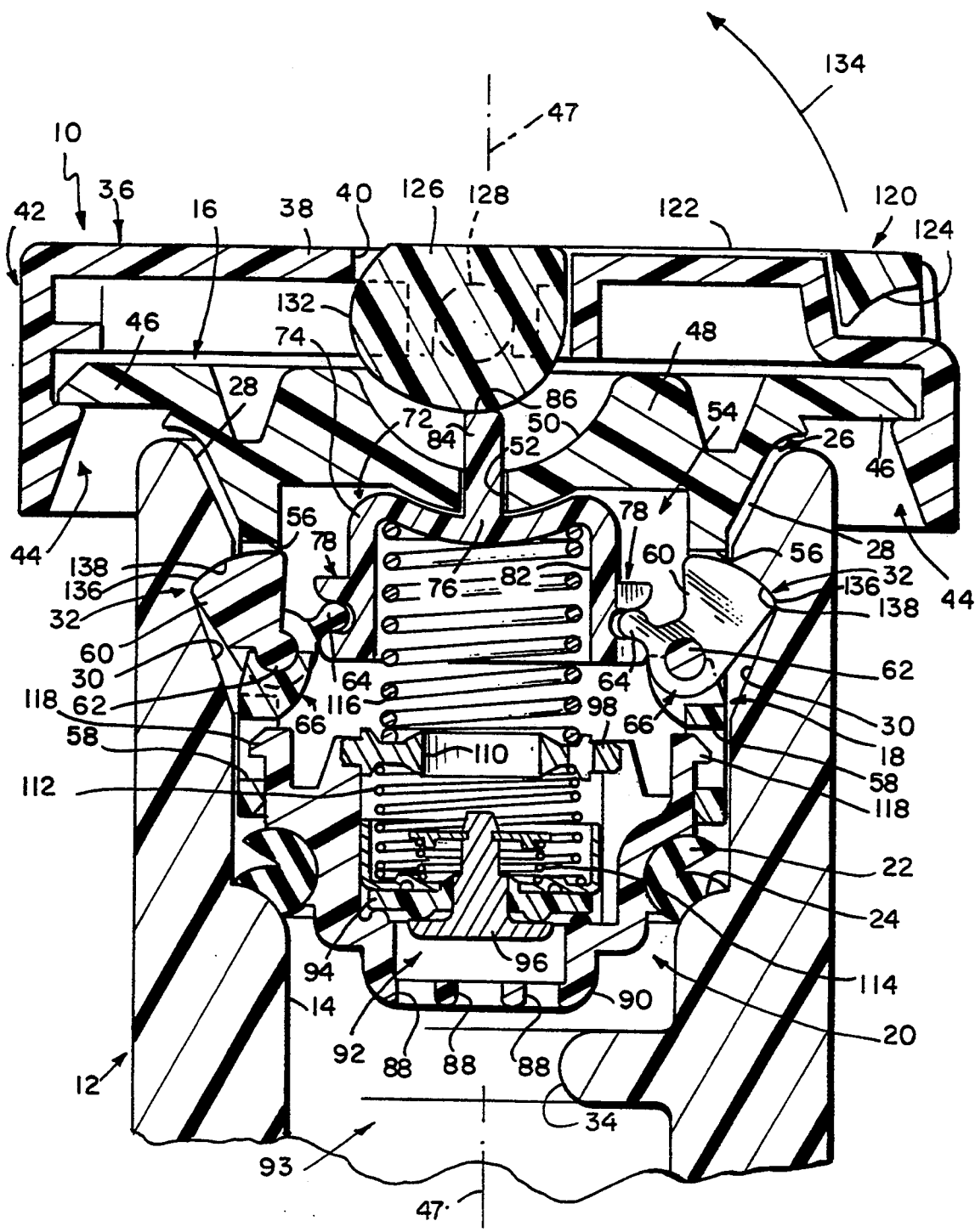
FIG. 1 is a sectional view of a cap according to the present invention showing a housing mounted in a fill passageway of a filler neck and retaining lugs pivotably mounted on the housing and spring-biased to fit into a lug-receiving undercut formed in the filler neck to retain the cap in a sealed fill passageway-closing position in the filler neck.

A push-on cap 10 in accordance with the present invention is mounted in filler neck 12 to close a fill passageway 14 formed in filler neck 12. Cap 10 includes an upper housing portion 16, a lower housing portion 18 rigidly connected to upper housing portion 16, and a closure member 20 coupled to lower housing portion 18 to allow limited relative movement between closure member 20 and lower housing portion 18. An O-ring sealing gasket 22 is carried on the closure member 20 and configured to seal against an annular seal-receiving seat 24 situated to lie in the fill passageway 14 in spaced-apart relation to the open mouth 26 of filler neck 12.

The filler neck 12 is configured to receive and retain the cap 10 in a sealed position closing the fill passageway 14 as shown in FIG. 1. The filler neck 12 is formed to include an axially inwardly diverging conical camming surface 28 and a single ring-shaped undercut cap-retention cavity 30. This cavity 30 is configured to open into the fill passageway 14 and lie between the conical camming surface 28 and the radially inwardly projecting seal-receiving seat 24. The cap-retention cavity 30 is configured in the manner described below to receive pivotable cap-retaining lugs 32 mounted on the lower housing portion 18 and hold the cap 10 in its filler neck-closing position shown in FIG. 1. In another embodiment (not shown), the filler neck 12 is formed to include a separate cap-retention cavity for each cap-retaining lug. The filler neck 12 also includes a reduced-diameter aperture 34 that is positioned in the fill passageway 14 below the seal-receiving seat 24 and sized to receive only a small-diameter nozzle (not shown for dispensing unleaded fuel.

Figure 8:
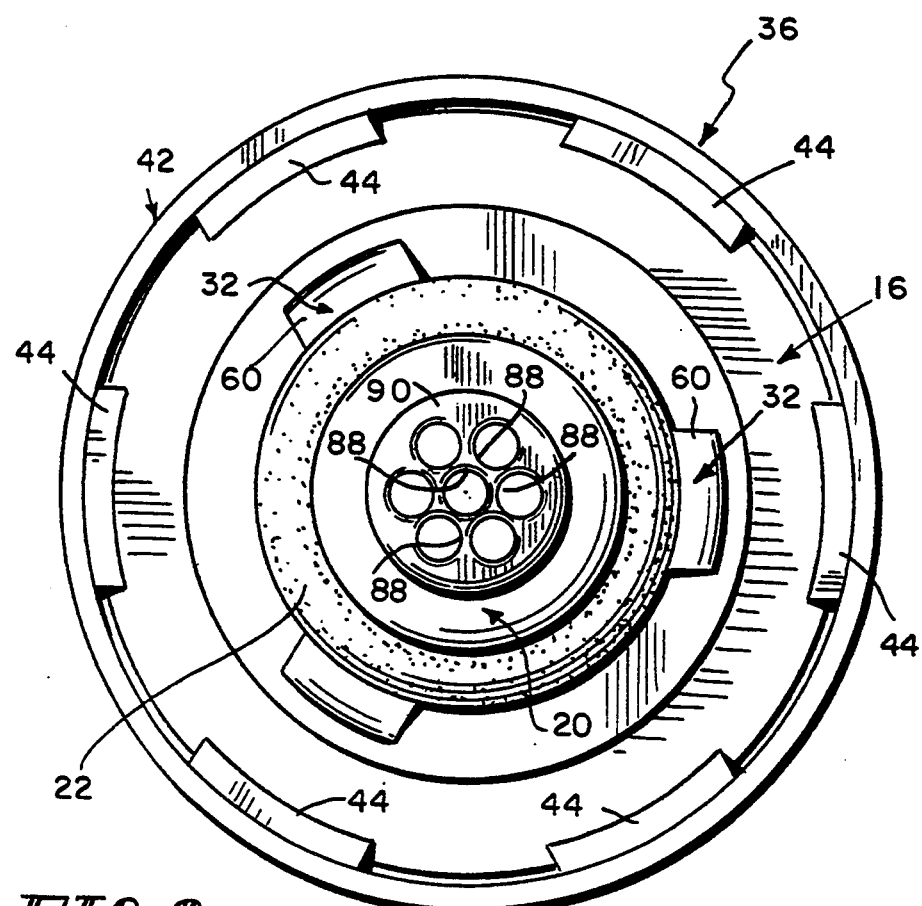
FIG. 8 is a bottom plan view of the cap of FIG. 7 showing the three pivotable retaining lugs uniformly spaced apart about the circumference of the housing and seven inlet apertures into a pressure-relief and vacuum-relief valve assembly mounted in the closure member.

The cap 10 further includes an outer shell 36 attached to the axially outer end of the upper housing portion 16. The outer shell 36 includes a top wall 38 formed to include a central slot-like aperture 40 and an annular side wall 42 formed to provide a handgrip. The side wall 42 also includes a plurality of circumferentially spaced-apart tangs 44 that snap onto an upper plate 46 on the upper housing portion 16 to retain the outer shell 36 in place on the upper housing portion 16 as shown in FIGS. 1 and 8. Illustratively, the outer shell 36 is coupled to upper plate 46 to allow for freely spinning movement of the outer shell about vertical axis 47 (FIG. 1) relative to upper housing portion 16.

The upper housing portion 16 includes a central core 48 surrounded by upper plate 46 and formed to include a cam-receiving depression 50 and a stem-receiving aperture 52. The stem-receiving aperture 52 provides a passageway between the cam-receiving depression 50 and an interior region 54 of the housing 16, 18. The upper and lower housing portions 16, 18 cooperate to define three lug-mounting slots 56 that are uniformly spaced apart about the circumference of housing 16, 18 and arranged so that each of the slots 56 confronts the cap-retention cavity 30 formed in the filler neck 12 upon movement of the cap 10 to the filler neck-closing position shown in FIG. 1. The lower housing portion 18 is formed to include arm-receiving channels 58 as shown in FIG. 1 to permit limited movement of closure member 20 relative to lower housing portion 18.

Figure 5:
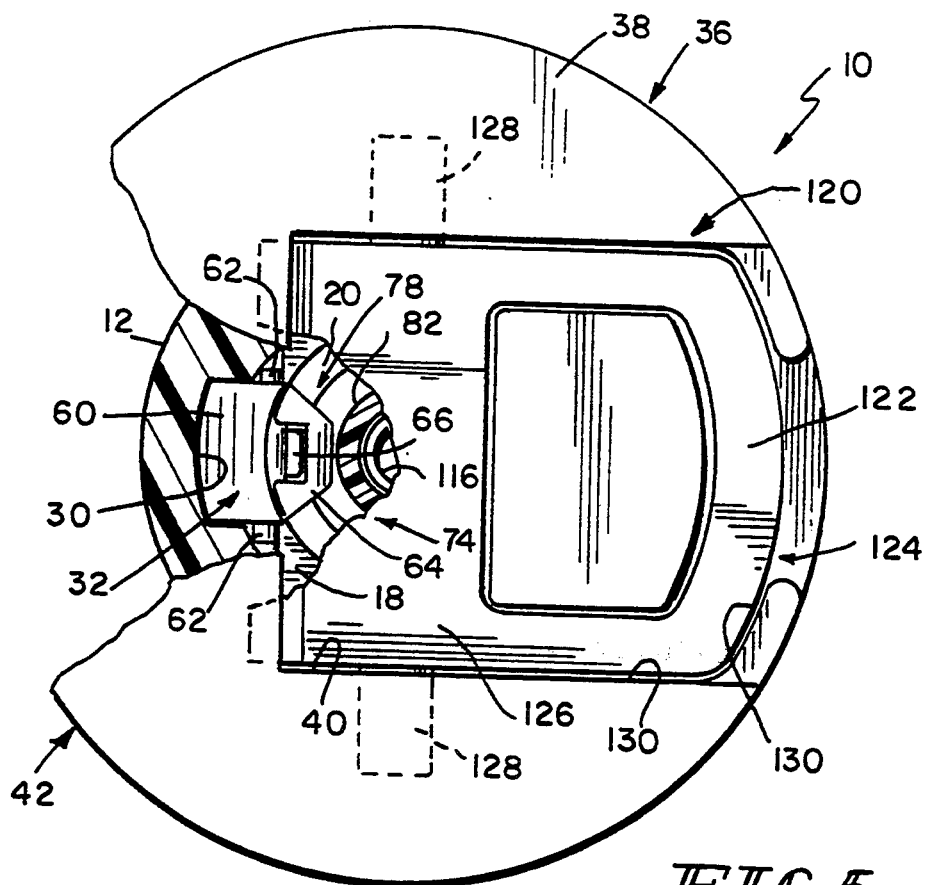
FIG. 5 is a top plan view of the cap of FIG. 1 with portions broken away to show a wide locking arm on one of the retaining lugs in the lug-receiving undercut formed in the filler neck and a narrow toggle lug on that retaining lug in engagement with a movable lug actuator and showing a D-shaped lever pivotably mounted on the cap to control movement of the lug actuator and toggling of the retaining lugs during release of the cap from its sealed filler neck-closing position.
Figure 6:
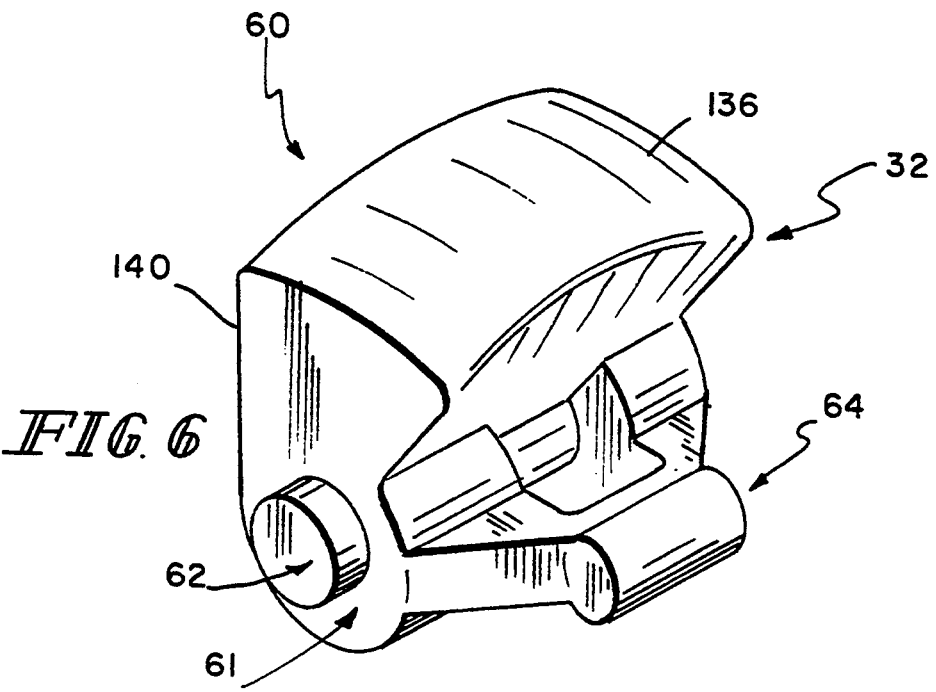
FIG. 6 is a perspective view of a preferred embodiment of the pivotable retaining lug shown in FIG. 5.
Figure 7:
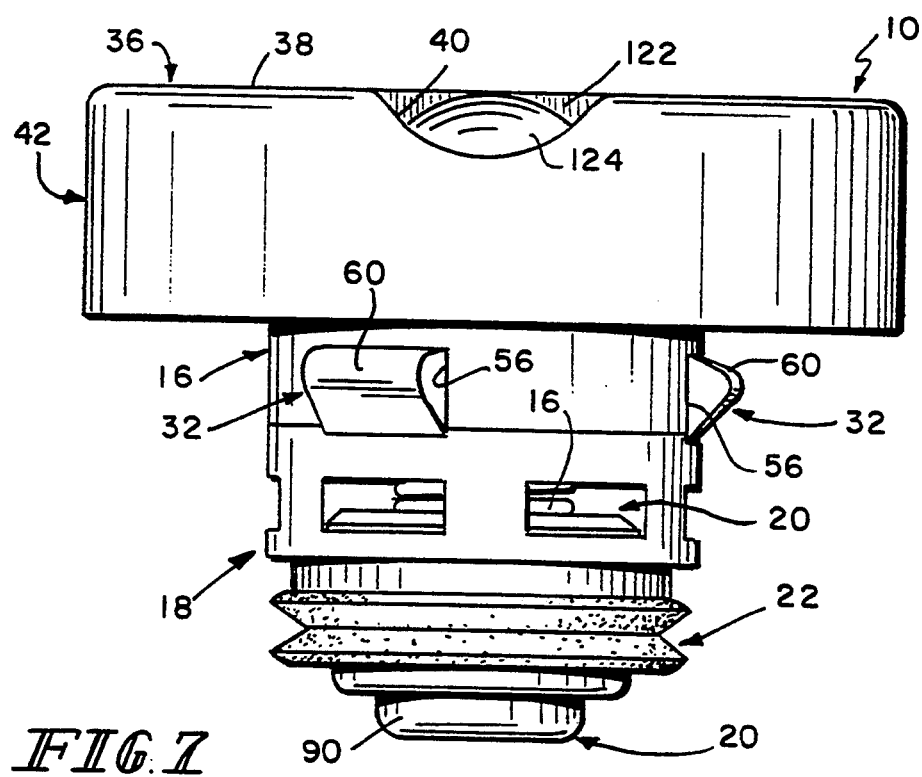
FIG. 7 is a side elevation view of the cap of FIG. 1 showing the handgrip on the outer shell, a two-part housing, two of the pivotable retaining lugs carried on the housing, the lug actuator-biasing spring inside the housing, the closure member, and an O-ring sealing gasket on the closure member.

As shown in FIGS. 1, 5, and 6, each retaining lug 32 includes a wide locking arm 60, a central body 61, pivot axle 62 appended to the central body 61, and a narrow toggle arm 64. Illustratively, each retaining lug 32 is a one-piece molded plastic part as shown in FIG. 6. It will be understood that retaining lug 32 could also be a multi-piece assembly including, for example, a separate pivot axle. The lower housing portion 18 and upper housing portion 16 are formed to include cradle means 66 for supporting and retaining each pivot axle 62 to mount each retaining lug 32 in one of the lug-mounting slots 56 formed in the housing 16, 18. Illustratively, nesting cradles are formed in the lower housing portion 18 and axle-retaining fingers are formed in the upper housing portion 16. Each retaining lug 32 is free to pivot about its pivot axle 62 between a radially outwardly extending projected position fitting in the cap-retention cavity 30 as shown, for example, in FIG. 1 and a radially inwardly extending retracted position away from the cap-retention cavity 30 as shown, for example, in FIG. 2.

A lug actuator 72 is positioned in the interior region 54 of housing 16, 18 and allowed to move vertically in the interior region 54 during installation and removal of the cap 10. Lug actuator 72 includes an inverted cup-shaped member 74, an upstanding stem 76, and means 78 for gripping each of the toggle arms 64 as shown in FIG. 1. The cup-shaped member 74 is arranged to open downwardly toward the closure member 20 and includes a concave top wall 80 and a cylindrical side wall 82. The upstanding stem 76 has a foundation end rooted in the concave top wall 80 and a free end 84. The free end 84 is arranged to extend through the stem-receiving aperture 52 formed in the upper housing portion 16 and formed to define a cam follower 86.

A plurality of gripping means 78 are formed in spaced-apart relation about the circumference of the cylindrical side wall 82 of the cup-shaped member 74. Each gripping means 78 is configured to move a toggle arm 64 to pivot the locking arm 60 appended to the toggle arm 64 about its pivot axle 62 between its projected and retracted positions. Illustratively, the gripping means 78 are configured to engage and move all of the toggle arms 64 simultaneously so that the retaining lugs 32 can be moved together either in radially outward directions to reach their projected positions or in radially inward directions to reach their retracted positions.

The closure member 20 is formed to include a plurality of inlet openings 88 in a lower end 90 located below O-ring sealing gasket 22 as shown in FIG. 1 so that a pressure-relief and vacuum-relief valve assembly 92 mounted in a cavity formed in the closure member 20 can regulate the pressure in lower portion 93 of fill passageway 14 while the cap 10 is seated in its sealed filler neck-closing position. Valve assembly 92 includes a pressure-relief valve 94, a vacuum-relief valve 96, a support plate 98 appended to closure member 20 and formed to include vent aperture 110, and springs 112, 114 for yieldably biasing the valves 94, 96 to their normally closed positions. Spring 112 engages support plate 98 and pressure-relief valve 94 to bias the pressure-relief valve 94 against an annular valve seat formed on closure member 20. Spring 114 engages a plate attached to vacuum-relief valve 96 and pressure-relief valve 94 to bias the vacuum-relief valve 96 against an annular valve seat formed on the underside of pressure-relief valve 94.

A compression spring 116 is positioned inside the interior region 54 of housing 16, 18 and arranged so that its axially inner end engages support plate 98 and its axially outer end extends into the cup-shaped member 74 of the lug actuator 72. As shown in FIG. 1, the ceiling inside cup-shaped member 74 is dome-shaped to provide a seat for engaging and retaining the axially outer end of the cylindrical compression spring 116. When assembled, the housing 16, 18 and the closure member 20 are held together for limited relative movement therebetween by engagement of snap arms 118 on closure member 20 in the slots 58 formed in the lower housing portion 18. The cap 10 is configured so that the compression spring 116 acts against the support plate 98 to apply a load to the lug actuator 72 that is sufficient to pivot all of the retainer lugs 32 normally to their projected positions.

As shown in FIGS. 1 and 5, a cap-release lever 120 is provided to enable a user to pivot the retaining lugs 32 from their cap-retaining projected positions engaging the filler neck 12 to their cap-releasing retracted positions disengaging the filler neck 12 and thereby begin to remove the cap 10 from the filler neck 12. Cap-release lever 120 includes a D-shaped lever handle 122 having a finger grip 124, a lever body 126, and pivot pins 128. The cap-release lever 120 is mounted to outer shell 36 for pivotable movement between a horizontal cap-retaining position as shown, for example, in FIG. 1 and a vertical cap-releasing position as shown, for example, in FIG. 2. As shown in FIG. 5, the outer shell 36 is formed to include a lever handle-receiving recess 130 to receive the D-shaped lever handle 122 in its horizontal position.

Lever body 126 is formed to include a cam surface 132 arranged to engage the cam follower 86 provided on the free end 84 of the lug actuator stem 76. Compression spring 116 acts against the lug actuator 72 to yieldably load the cam follower 86 against cam surface 132. During pivoting of cap-release lever 120, the cam surface 132 engages the cam follower 86 and imparts movement to the lug actuator 72.

Figure 2:
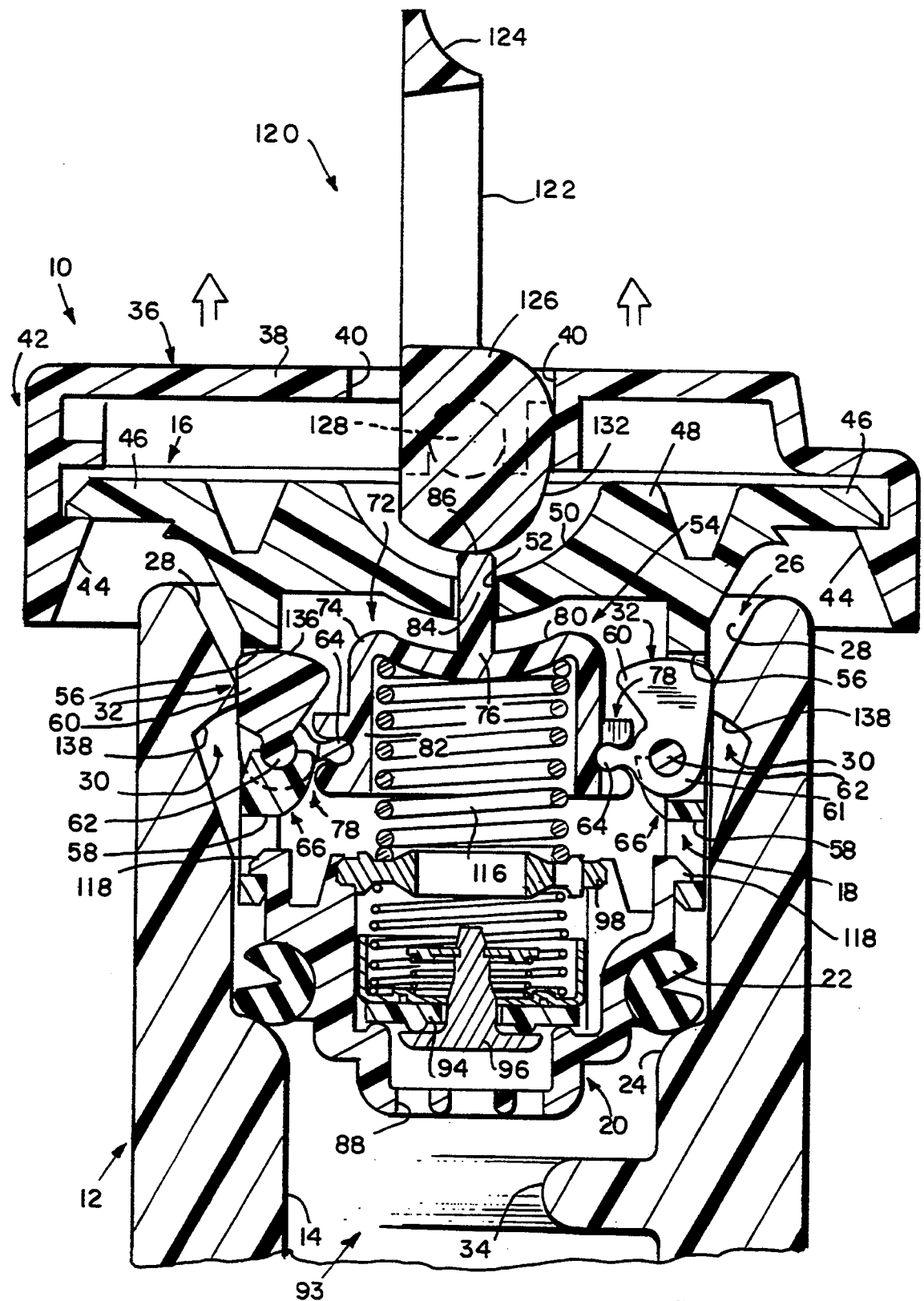
FIG. 2 is a view of the cap of FIG. 1 showing a cap-release lever after it has been pivoted to its vertical position to pivot the retaining lugs out of the undercut to their respective positions and showing an upper portion of the cap after it has been moved upwardly a short distance in the fill passageway away from the underlying closure member and O-ring sealing gasket to raise the retracted retaining lugs above the lug-receiving undercut.
Figure 3:
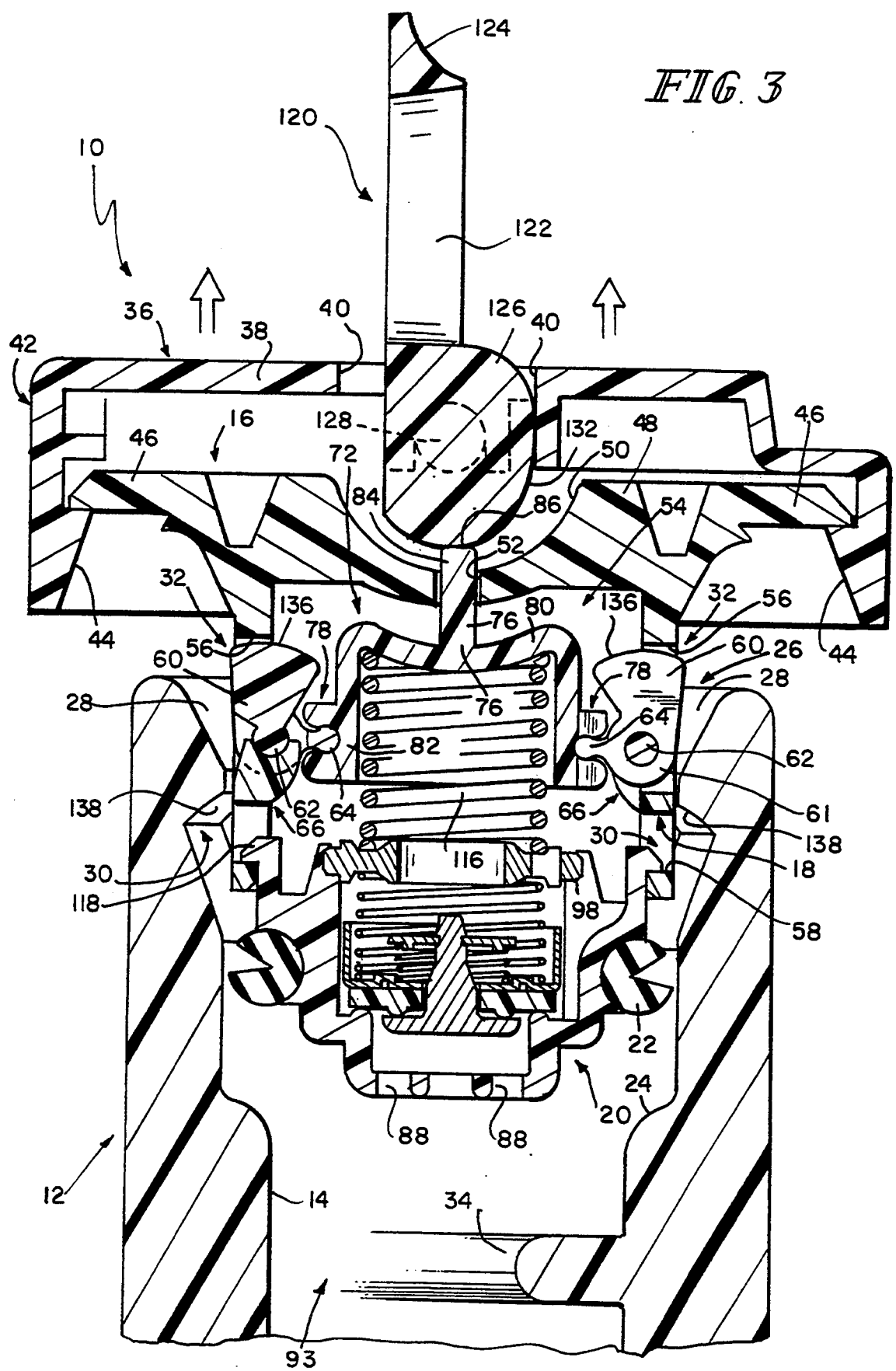
FIG. 3 is a view showing further upward movement of the cap in the fill passageway as it is being manually withdrawn from the filler neck.

In use, the cap 10 is released from its filler neck-closing position in fill passageway 14 by pivoting the cap-release lever 120 in the following manner. The user lifts the finger grip 124 to pivot the lever handle 122 in direction 134 about pivot pins 128 as shown in FIGS. 1 and 2. Pivoting movement of lever handle 122 in direction 134 causes the cam surface 132 to push against the cam follower 86 and drive the lug actuator 72 downwardly inside housing 16, 18. This downward movement of lug actuator 72 compresses preloaded main compression spring 116 further and pivots the toggle-retaining lugs 32 inward and out of the undercut cap-retention cavity 30 formed in the filler neck 12. As soon as the curved top surface 136 of each locking arm 60 disengages a curved downwardly facing retaining wall 138 of filler neck 12 in the cap-retention cavity 30, the preloaded main compression spring 116 drives the retaining lugs 32 upwardly past the undercut cap-retention cavities 30 to allow the user to withdraw the cap 10 manually from the filler neck 12 as shown in FIG. 3.

Figure 4:
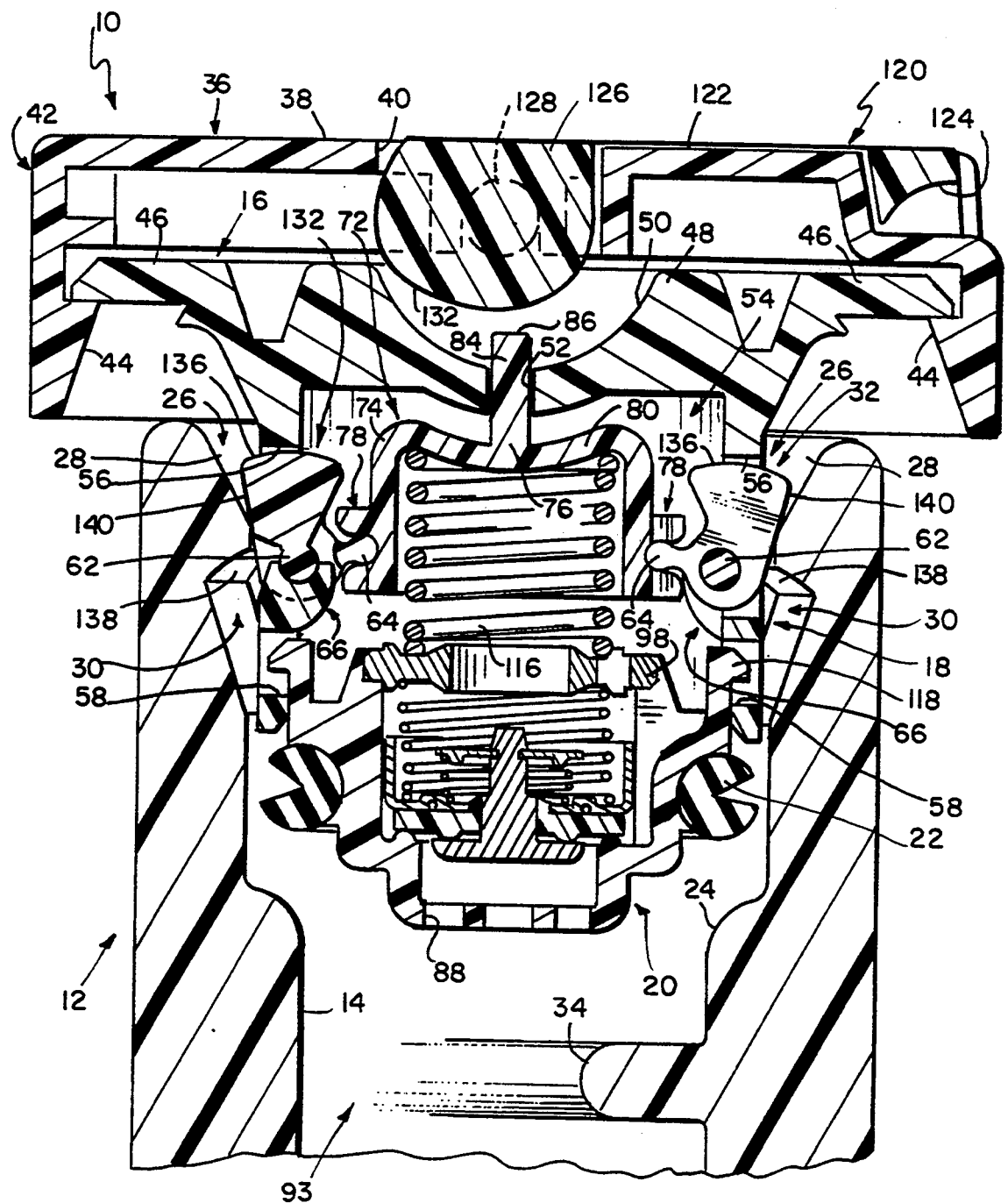
FIG. 4 is a view of cap installation showing movement of the housing and closure member into the fill passageway during installation of the cap on the filler neck and showing pivoting of the retaining lugs in radially inward directions toward their retracted positions upon camming engagement with a conical camming surface located at the mouth of the filler neck.

During installation of cap 10 in filler neck 12, the closure member 20 and housing 16, 18 are inserted as a unit into fill passageway 14 through the filler neck mouth 26 as shown in FIG. 4. If one ring-shaped cap-retention cavity 30 is provided, then the cap 10 can be pushed into fill passageway 14 without first rotating the cap 10 about vertical axis 47 to a predetermined position. However, if a cap-retention cavity is provided for each retaining lug 32, it will be necessary for a user to orient the cap 10 relative to filler neck 12 by rotating the cap 10 about axis 47 to an installation position matching up the position of the retaining lugs 32 to the position of the underlying cap-retention cavities.

The user pushes on the outer shell 36 while the cap-release lever 120 is retained in its horizontal cap-retaining position to move the cap 10 further into fill passageway 14. As shown in FIG. 4, a cam follower 140 on each retaining lug 32 contacts conical camming surface 28 at the open mouth 26 of filler neck 12 to cause the retaining lugs 32 to be pivoted radially inwardly automatically to their retracted positions. As soon as the cap 10 is pushed far enough into fill passageway 14, the spring-loaded retaining lugs 32 pivot radially outwardly to snap automatically into the cap-retention cavity 30. The spring 116 then urges the O-ring sealing gasket 22 into sealing engagement with the seal-receiving seat 24 formed in the filler neck 12 as shown in FIG. 1. Once the fill passageway 14 is closed by closure member 20, excess pressure in lower portion 93 of fill passageway 14 is vented by pressure-relief valve 94 to the atmosphere and vacuum-relief valve 96 vents air into the lower portion 93 to relieve excess vacuum conditions therein.

If the installation stroke is insufficient to latch the toggle-type retaining lugs 32 and the user lets go of the outer shell 36, then the spring-loaded retaining lugs 32 will ordinarily be driven by lug actuator 72 and spring 116 out of fill passageway 14 and into the user's hand. Advantageously, this step provides a signal to the user that the cap 10 did not seat in the filler neck 12 and that it is necessary to once again push the cap 10 into fill passageway 14 until it snaps into its filler neck-closing position.

Although the invention has been described in detail with reference to certain preferred embodiments, variations and modifications exist within the scope and spirit of the invention as described and defined in the following claims.

I claim:

1. A cap for use in a filler neck of a tank, the filler neck being formed to include an outer mouth, a fill passageway communicating with the outer mouth, a cap-retention cavity opening into the fill passageway, and a seal-receiving seat lying in the fill passageway in spaced-apart relation to the outer mouth, the cap comprising a housing sized to fit into the fill passageway, the housing having an axially inner end and an axially outer end, closure means for closing the filler neck, the closure means being coupled to the axially inner end of the housing, means for pushing the housing and closure means into the fill passageway to seat the closure means on the seal-receiving seat, the pushing means being attached to the axially outer end of the housing, and means for retaining the housing and the closure means in a filler neck-closing position in the fill passageway so that the closure means sealingly engages the seal-receiving seat to close the fill passageway, the retaining means including at least one retaining lug, means for pivotably coupling each retaining lug to the housing for pivoting movement between a projected position fitting into the cap-retention cavity and a retracted position lying outside the cap-retention cavity during movement of the housing into and out of the fill passageway, and spring means for yieldably biasing each retaining lug toward its projected position so that it snaps automatically from its retracted position into the cap-retention cavity to retain the housing and closure means in the filler neck-closing position during installation of the cap on the filler neck.

2. The cap of claim 1, wherein the housing is a cylindrical sleeve having an interior region and carrying the mounting means and the spring means is positioned to extend into the interior region of the cylindrical sleeve.

3. The cap of claim 2, wherein the retaining means includes a plurality of retaining lugs arranged in spaced-apart relation around a circumference of the cylindrical sleeve and in radially outwardly spaced-apart relation to said cylindrical sleeve.

4. The cap of claim 1, wherein the housing is a cylindrical sleeve and the retaining means includes a plurality of retaining lugs arranged in spaced-apart relation about a circumference of the cylindrical sleeve and coupled to the coupling means to pivot in radially inward and outward directions with respect to the cylindrical sleeve during movement of the retaining lugs between the projected and retracted positions and during movement of the housing into and out of the fill passageway.

5. The cap of claim 4, further comprising control means for pivoting the retaining lugs simultaneously in radially inward directions from their projected positions to their retracted positions, the control means being mounted on the axially outer end of the housing.

6. The cap of claim 5, wherein the pushing means includes a handgrip cover mounted on the axially outer end of the housing, the handgrip cover is formed to include an aperture, and the control means extends through the aperture.

7. The cap of claim 5, wherein the control means includes a movable lug actuator in the housing and means for moving the lug actuator in the housing and the lug actuator includes means for engaging the retaining lugs to cause the retaining lugs to pivot in response to movement of the lug actuator in the housing.

8. The cap of claim 4, further comprising a controller, means for mounting the controller on the housing for movement between a cap-retaining position and a cap-releasing position, and means for pivoting the retaining lugs between their projected and retracted positions in response to movement of the controller relative to the housing.

9. The cap of claim 8, wherein the mounting means includes an outer shell coupled to the axially outer end of the housing, the pivoting means includes a movable lug actuator positioned to lie in the housing and configured to engage the retaining lugs, and the controller is a pivotable lever carried on the outer shell and including means for moving the movable lug actuator in the housing to control pivoting movement of the retaining lugs.

10. The cap of claim 8, wherein each retaining lug includes a toggle arm engaging the pivoting means and a locking arm configured to fit into the cap retention cavity, the controller is a lever, the mounting means includes an outer shell coupled to the axially outer end of the housing and means for supporting the lever for pivotable movement relative to the outer shell, and the lever includes a grip handle and cam means for moving the pivoting means relative to the housing against the toggle arms to pivot each retaining lug to move the locking arms into the cap-retention cavity in response to pivoting movement of the lever relative to the outer shell.

11. The cap of claim 8, wherein the spring means engages the closure means and the pivoting means.

12. The cap of claim 1, wherein the closure means includes a closure member, a sealing gasket on the closure member, and means for connecting the closure member to the housing to permit relative movement therebetween in the fill passageway so that the housing is free to move in an axially inward direction into the fill passageway and relative to the closure member upon seating of the sealing gasket on the seal-receiving seat of the filler neck.

13. A cap for use in a filler neck of a tank, the filler neck being formed to include an outer mouth, a fill passageway communicating with the outer mouth, a cap-retention cavity opening into the fill passageway, and a seal-receiving seat lying in the fill passageway in spaced-apart relation to the outer mouth, the cap comprising a housing sized to fit into the fill passageway, the housing having an axially inner end and an axially outer end, closure means for closing the filler neck, the closure means being coupled to the axially inner end of the housing, means for pushing the housing and closure means into the fill passageway to seat the closure means on the seal-receiving seat, the pushing means being coupled to the axially outer end of the housing, and means for retaining the housing and the closure means in a filler neck-closing position in the fill passageway so that the closure means sealingly engages the seal-receiving seat to close the fill passageway, the retaining means including at least one retaining lug, means for mounting each retaining lug to the housing for movement between a projected position fitting into the cap-retention cavity and a retracted position lying outside the cap-retention cavity during movement of the housing into and out of the fill passageway, and spring means for yieldably biasing each retaining lug toward its projected position so that it snaps automatically from its retracted position into the cap-retention cavity to retain the housing and closure means in the filler neck-closing position during installation of the cap on the filler neck, the housing being a cylindrical sleeve having an interior region and carrying the mounting means and the spring means being positioned to extend into the interior region of the cylindrical sleeve, the closure means including a closure member and a sealing gasket on the closure member, the retaining means further including a movable lug actuator coupled to each retaining lug, and the spring means including a compression spring having an axially inner end engaging the closure member and an axially outer end engaging the lug actuator.

14. The cap of claim 13, further comprising control means for moving the lug actuator against the compression spring to move each retaining lug from its projected position to its retracted position to permit withdrawal of the housing and closure means from the fill passageway.

15. The cap of claim 13, wherein the lug actuator is positioned for movement in the interior region of the housing and lies between the pushing means and the compression spring.

16. A cap for use in a filler neck of a tank, the filler neck being formed to include an outer mouth, a fill passageway communicating with the outer mouth, a cap-retention cavity opening into the fill passageway, and a seal-receiving seat lying in the fill passageway in spaced-apart relation to the outer mouth, the cap comprising a housing sized to fit into the fill passageway, the housing having an axially inner end and an axially outer end, closure means for closing the filler neck, the closure means being coupled to the axially inner end of the housing, means for pushing the housing and closure means into the fill passageway to seat the closure means on the seal-receiving so the pushing means being coupled to the axially outer end of the housing, and means for retaining the housing and the closure means in a filler neck-closing position in the fill passageway so that the closure means sealingly engages the seal-receiving seat to close the fill passageway, the retaining means including at least one retaining lug, means for mounting each retaining lug to the housing for movement between a protected position fitting into the cap-retention cavity and a retracted position lying outside the cap-retention cavity during movement of the housing into and out of the fill passageway, and spring means for yieldably biasing each retaining lug toward its projected position so that it snaps automatically from its retracted position into the cap-retention cavity to retain the housing and closure means in the filler neck-closing position during installation of the cap on the filler neck, the closure means including a closure member, a sealing gasket on the closure member, and means for coupling the closure member to the housing to permit relative movement therebetween in the fill passageway so that the housing is free to move in an axially inward direction into the fill passageway and relative to the closure member upon seating of the sealing gasket on the seal-receiving seat of the filler neck, the retaining means further including a movable lug actuator arranged to lie in the housing and contact each retaining lug, the spring means including a compression spring engaging the closure member and the lug actuator, and the housing including means for moving the lug actuator toward the closure member to compress the compression spring during movement of the housing into the fill passageway and movement of the retaining lugs to their projected positions.

17. The cap of claim 16, further comprising control means for moving the lug actuator against the compression spring to compress the compression spring and pivot the retaining lugs to their retracted positions so that the housing is allowed to move relative to the closure means under a force applied by the compression spring and the housing and closure means are removable from the fill passageway.

18. The cap of claim 16, wherein the lug actuator further includes a cup-shaped member engaging the compression spring and having a cylindrical side wall extending downwardly toward the sealing gasket and a gripping means appended to the cylindrical side wall and the gripping means is configured to engage and move the retaining lugs.

19. A cap for use in a filler neck of a tank, the filler neck being formed to include an outer mouth, a fill passageway communicating with the outer mouth, and a seal-receiving seat lying in the fill passageway in spaced-apart relation to the outer mouth, the cap comprising closure means for closing the filler neck, the closure means including a sealing gasket for abutting the seal-receiving seat without contacting the outer mouth, a housing coupled to the closure means and sized to extend into the fill passageway through the open mouth, means for retaining the housing and the closure means in the fill passageway, the retaining means being mounted on the housing for movement between a filler neck-engaging position and a filler neck-releasing position, control means for moving the retaining means from its filler neck-engaging position to its filler neck-releasing position, and spring means for urging the sealing gasket of the closure means against the seal-receiving seat of the filler neck to establish a seal between the closure means and the filler neck, the spring means engaging the control means and the closure means.

20. The cap of claim 19, wherein the retaining means includes at least one retaining lug and means for pivotably mounting each retaining lug on the housing for pivotable movement about a pivot axis between a filler neck-engaging position and a filler neck-releasing position.

21. The cap of claim 20, wherein the control means includes a lever pivotably mounted on the housing and a movable lug actuator in the housing engaging the at least one retaining lug, and means for moving the lug actuator to pivot the at least one retaining lug in response to pivoting movement of the lever relative to the housing.

22. The cap of claim 20, wherein the housing includes a cylindrical sleeve, the retaining means includes a plurality of retaining lugs arranged in spaced-apart relation about the circumference of the cylindrical sleeve and arranged to pivot in radially inward and outward directions with respect to the cylindrical sleeve, and the control means includes a controller above the housing and a lug actuator positioned to move in the cylindrical sleeve and configured to include means for pivoting the retaining lugs simultaneously in one of the radially inward direction and radially outward direction to move the retaining lugs between their filler neck-engaging and filler neck-releasing positions in response to movement of the controller relative to the housing.

23. The cap of claim 22, wherein the filler neck is formed to include an inner wall defining the fill passageway and cavity means in the inner wall for receiving the retaining lugs upon movement of the retaining lugs in radially outward directions to their filler neck-retaining positions.

24. The cap of claim 22, wherein each retaining lug includes a toggle arm engaging the pivoting means of the actuator and a locking arm configured to engage an undercut cavity formed in the filler neck upon pivoting movement of the retaining lug to its filler neck-engaging position.

25. The cap of claim 22, wherein the controller includes a lever, the housing includes means for mounting the lever to the housing for pivotable movement between a horizontal cap-retaining position and a vertical cap-releasing position, and the lever includes means for moving the lug actuator further into the cylindrical sleeve to pivot the retaining lugs in radially inward directions to their filler neck-releasing positions in response to movement of the lever relative to the housing from its horizontal cap-retaining position to its vertical cap-releasing position.

26. The cap of claim 19, wherein the filler neck is formed to include lug-receiving cavity means for receiving each retaining lug and the control means includes means for pivoting the retaining lugs simultaneously to cause each retaining lug to pivot into the lug-receiving cavity means to establish the filler neck-engaging position and out of the lug-receiving cavity means to establish the filler neck-releasing position.

27. The cap of claim 26, wherein each retaining lug includes a locking arm and a toggle arm, the pivoting means includes a lug actuator coupled to the toggle arms and arranged to slide in opposite directions in an interior region of the housing, and the control means further includes means coupled to the housing for moving the lug actuator in a first direction further into the interior region of the housing to pivot the retaining lugs so that the locking arms of the retaining lugs move out of the lug-receiving cavity means formed in the filler neck and the housing and closure means is removable from the fill passageway.

28. The cap of claim 19, wherein the filler neck includes means for automatically camming the retaining means to its filler neck-releasing position during insertion of the housing and closure means into the fill passageway.

29. The cap of claim 28, wherein the control means includes a movable lug actuator positioned to move in the housing and configured to include means for transmitting a spring force generated by the spring means to the retaining means to yieldably bias the retaining means to its filler neck-engaging position upon disengagement of the retaining means and the camming means.

30. The cap of claim 29, wherein the camming means includes an axially inwardly converging conical surface at the outer mouth of the filler neck, the filler neck is formed to include cavity means for receiving the retaining means in its filler neck-engaging position to lock the housing and closure means in a fixed position closing the fill passageway, the cavity means is located between the axially inwardly converging conical surface and the seal-receiving seat, the retaining means includes at least one retaining lug and means for pivotably mounting each retaining lug on the housing for pivotable movement about a pivot axis, the movable lug actuator includes a cup-shaped member engaging the spring means and means on the cup-shaped member for pivoting each retaining lug about its pivot axis into and out of the cavity means in response to movement of the movable lug actuator in the fill passageway.

31. A cap for use in a filler neck of a tank, the filler neck being formed to include an outer mouth, a fill passageway communicating with the outer mouth, and a seal-receiving seat lying in the fill passageway in spaced-apart relation to the outer mouth, the cap comprising closure means for closing the filler neck, the closure means including a sealing gasket, a housing coupled to the closure means and sized to extend into the fill passageway through the open mouth, means for retaining the housing and the closure means in the fill passageway, the retaining means being mounted on the housing for movement between a filler neck-engaging position and a filler neck-releasing position, control means for moving the retaining means from its filler neck-engaging position to its filler neck-releasing position, and spring means for urging the sealing gasket of the closure means against the seal-receiving seat of the filler neck to establish a seal between the closure means and the filler neck, the spring means engaging the control means and the closure means, the retaining means including at least one retaining lug and means for pivotably mounting each retaining lug on the housing for pivotable movement about a pivot axis between a filler neck-engaging position and a filler neck-releasing position, the control means including a lever pivotably mounted on the housing and a movable lug actuator in the housing engaging the at least one retaining lug, and means for moving the lug actuator to pivot the at least one retaining lug in response to pivoting movement of the lever relative to the housing, each retaining lug including a toggle arm engaging the movable lug actuator and a locking arm configured to engage an undercut cavity formed in the filler neck upon pivoting movement of the retaining lug to its filler neck-engaging position.

32. A cap for use in a filler neck of a tank, the filler neck being formed to include an outer mouth, a fill passageway communicating with the outer mouth, and a seal-receiving seat lying in the fill passageway in spaced-apart relation to the outer mouth, the cap comprising closure means for closing the filler neck, the closure means including a seal gasket, a housing coupled to the closure means and sized to extend into the fill passageway through the open mouth, means for retaining the housing and the closure means in the fill passageway, the retaining means being mounted on the housing for movement between a filler neck-engaging position and a filler neck-releasing position, control means for moving the retaining means from its filler neck-engaging position to its filler neck-releasing position, spring means for urging the sealing gasket of the closure means against the seal-receiving seat of the filler neck to establish a seal between the closure means and the filler neck, the spring means engaging the control means and the closure means, the filler neck including means for automatically camming the retaining means to its filler neck-releasing position during insertion of the housing and closure means into the fill passageway, and each retaining lug including a radially outwardly facing cam follower surface and the camming means is a conical surface formed in the outer mouth of the filler neck and positioned to engage the radially outwardly facing cam follower surface during insertion of the housing into the fill passageway.

33. A cap for use in a filler neck of a tank, the filler neck being formed to include an outer mouth, a fill passageway communicating with the outer mouth, and a seal-receiving seat lying in the fill passageway in spaced-apart relation to the outer mouth, the cap comprising closure means for closing the filler neck, the closure means including a sealing gasket, a housing coupled to the closure means and sized to extend into the fill passageway through the open mouth, means for retaining the housing and the closure means in the fill passageway, the retaining means being mounted on the housing for movement between a filler neck-engaging position and a filler neck-releasing position, control means for moving the retaining means from its filler neck-engaging position to its filler neck-releasing position, spring means for urging the sealing gasket of the closure means against the seal-receiving seat of the filler neck to establish a seal between the closure means and the filler neck, the spring means engaging the control means and the closure means, the filler neck including means for automatically camming the retaining means to its filler neck-releasing position during insertion of the housing and closure means into the fill passageway, and the filer neck being formed to include cavity means for receiving the retaining means in its filler neck-engaging position and the cavity means being located between the camming means and the seal-receiving seat.

34. The cap of claim 33, wherein the filler neck has a longitudinal axis and includes an axially downwardly facing surface defining an upper wall of the cavity means and the spring means bears on the control means to provide means for urging the retaining means upwardly into engagement with the axially downwardly facing surface.

35. A cap for use in a filler neck of a tank, the filler neck being formed to include an outer mouth, a fill passageway communicating with the outer mouth, and a seal-receiving seat lying in the fill passageway in spaced-apart relation to the outer mouth, the cap comprising closure means for closing the filler neck, the closure means including a sealing gasket, a housing attached to the closure means and sized to extend into the fill passageway through the open mouth, the housing being formed to include an interior region, means for retaining the housing and the closure means in the fill passageway, the retaining means including at least one retaining lug, each retaining lug being coupled to the housing for pivotable movement between a filler neck-engaging position and a filler neck-releasing position, control means for moving the retaining means from its filler neck-engaging position to its filler neck-releasing position, the control means including an actuator movable in the interior region, and spring means for during the sealing gasket of the closure means against the seal-receiving seat of the filler neck to establish a seal between the closure means and the filler neck, the spring means engaging the actuator and the closure means, the actuator including means for engaging each retaining lug, and the control means further including means for moving the actuator in the housing against the spring means to pivot each retaining lug from its filler neck-engaging position to its filler neck-releasing position.

36. The cap of claim 35, wherein the filler neck is formed to include a lug-receiving cavity for receiving each retaining lug and an axially inwardly facing edge bordering the lug-receiving cavity, each retaining lug is sized to fit in the lug-receiving cavity in its filler neck-engaging position, and the spring means acts against the engaging means of the actuator to urge each retaining lug into engagement with the axially inwardly facing edge of the filler neck and against the closure means to urge the sealing gasket against the seal-receiving seat of the filler neck.

37. The cap of claim 36, wherein the moving means includes a lever including a cam and the actuator includes a cam follower in engagement with the cam.

38. The cap of claim 36, wherein the moving means includes a lever and means for mounting the lever to the housing for pivotable movement relative to the housing between a cap-retaining position and a cap-releasing position, the actuator includes a cam follower, and the lever includes cam means for camming the cam follower to move the actuator in the housing and against the spring means so that each retaining lug is pivoted to its filler neck-releasing position upon pivoting of the lever to its cap-releasing position.

39. A cap for use in a filler neck of a tank, the filer neck being formed to include an outer mouth, a fill passageway communicating with the outer mouth, a cap-retention cavity opening into the fill passageway, and a seal-receiving seat lying in the fill passageway in spaced-apart relation to the outer mouth, the cap comprising
- a housing sized to fit into the fill passageway, the housing having an axially inner end facing into the fill passageway and an axially outer end facing away from the fill passageway,
- closure means for closing the filler neck, the closure means being coupled to the axially inner end of the housing,
- means for retaining the housing and the closure means in a filler neck-closing position in the fill passageway so that the closure means sealingly engages the seal-receiving seat to close the fill passageway, and
- spring means for yieldably biasing the retaining means toward the filler neck-closing position and the spring means including a compression spring having an axially inner end facing into the fill passageway and engaging the closure means and an axially outer end facing away from the fill passageway and engaging the retaining means.

40. The cap of claim 39, further including means for pushing the housing and closure means into the fill passageway to seat the closure means on the seal-receiving seat, the pushing means being coupled to the axially outer end of the housing.

41. The cap of claim 39, wherein the retaining means further includes means for mounting the retaining means to the housing for movement between a projected position fitting into the cap-retention cavity and a retracted position lying outside the cap-retention cavity during movement of the housing into and out of the fill passageway.

42. The cap of claim 41, wherein the retaining means further includes at least one retaining lug, and the spring means biases the at least one retaining lug toward its projected position so that it snaps automatically from its retracting position into the cap-retention cavity to retain the housing and closure means in the filler neck-closing position during installation of the cap in the filler neck.

* * * * *